(12) United States Patent
Bica

(10) Patent No.: US 7,873,764 B2
(45) Date of Patent: Jan. 18, 2011

(54) SWITCH WITH ENHANCED HUMAN INTERFACE DEVICE SUPPORT

(75) Inventor: Adrian Bica, Twinsburg, OH (US)

(73) Assignee: Video Products, Inc., Aurora, OH (US)

(*) Notice: Subject to any disclaimer, the term of this patent is extended or adjusted under 35 U.S.C. 154(b) by 291 days.

(21) Appl. No.: 12/192,587

(22) Filed: Aug. 15, 2008

(65) Prior Publication Data
US 2010/0042763 A1    Feb. 18, 2010

(51) Int. Cl.
*G06F 13/10* (2006.01)

(52) U.S. Cl. .............................. 710/62; 710/72; 703/24; 703/25

(58) Field of Classification Search ........................ None
See application file for complete search history.

(56) References Cited

U.S. PATENT DOCUMENTS

| | | | |
|---|---|---|---|
| 7,284,278 B2 * | 10/2007 | Anson et al. .................. 726/34 |
| 7,299,309 B2 * | 11/2007 | Ulenas ........................ 710/67 |
| 7,418,525 B2 * | 8/2008 | Dalton et al. .................. 710/5 |
| 7,472,217 B2 * | 12/2008 | Lou et al. .................... 710/316 |
| 7,496,697 B2 * | 2/2009 | Sween et al. .................. 710/38 |
| 7,502,803 B2 * | 3/2009 | Culter et al. ...................... 1/1 |
| 7,555,570 B2 * | 6/2009 | Hickey et al. .................. 710/8 |
| 7,561,937 B2 * | 7/2009 | Reed et al. .................. 700/109 |
| 7,567,233 B2 * | 7/2009 | Garibaldi et al. ............ 345/157 |
| 7,647,431 B2 * | 1/2010 | Dalton et al. .................. 710/5 |
| 7,657,106 B2 * | 2/2010 | Fujita et al. ................. 382/232 |
| 7,657,665 B2 * | 2/2010 | Dalton et al. .................. 710/5 |
| 7,747,960 B2 * | 6/2010 | Garibaldi et al. ............ 715/767 |
| 7,774,523 B2 * | 8/2010 | Chen et al. .................... 710/62 |
| 7,784,071 B2 * | 8/2010 | Vince et al. .................... 725/30 |
| 2005/0216620 A1* | 9/2005 | Sandulescu et al. ........... 710/62 |
| 2009/0031049 A1* | 1/2009 | Lien et al. ....................... 710/6 |

* cited by examiner

*Primary Examiner*—Cheng-Yuan Tseng
(74) *Attorney, Agent, or Firm*—Renner Otto Boisselle & Sklar LLP

(57) ABSTRACT

The present invention relates to a system and method for switching keyboard human interface devices (HIDs) and video displays. Provided is a switch with emulation support for advanced HID features. The switch uses information contained in HID report descriptors to extract information contained in HID reports and insert the extracted information into a switch report, which is sent to a host computer.

28 Claims, 21 Drawing Sheets

```
Usage Page (Consumer)                           05 0C
Usage (Remote Control)                          09 01
Collection (Application)                              A1 01
  Usage Page (Generic Desktop Control)                05 01
  Usage (Mouse)                                 09 02
  Collection (Logical)                                A1 02
    Report ID (19)                                    85 13
    Usage Page (Consumer)                             05 0C
    Usage (Reserved)                            0A 38 02
    Report Count (1)                                  95 01
    Report Size (8)                                   75 08
    Logical Minimum (-127)                            15 81
    Logical Maximum (127)                             25 7F
    Input (Data, Variable, Relative)                        81 06
    Report ID (20)                                    85 14
    Usage Page (Reserved)                             06 00 FF
    Usage (Reserved)                            0A 01 FE
    Report Size (2)                                   75 02
    Logical Minimum (0)                         15 00
    Logical Maximum (3)                         25 03
    Input (Data, Variable, Absolute)                        81 02
    Usage (Reserved)                            0A 02 FE
    Usage (Reserved)                            0A 00 FE
    Report Count (2)                                  95 02
    Report Size (1)                                   75 01
    Logical Maximum (1)                         25 01
    Input (Data, Variable, Absolute)                        81 02
    Usage (Reserved)                            0A 03 FF
    Report Count (1)                                  95 01
    Report Size (2)                                   75 02
    Logical Maximum (3)                         25 03
    Input (Data, Variable, Absolute)                        81 02
    Input (Constant)                                  81 01
    Report ID (21)                                    85 15
    Report Size (1)                                   75 01
    Logical Maximum (1)                         25 01
    Usage (Reserved)                            0A 0B FF
    Input (Data, Variable, Absolute)                        81 02
    Report Size (7)                                   75 07
    Input (Constant)                                  81 01
    Usage (Reserved)                            0A 0D FF
    Report Size (16)                                  75 10
    Logical Maximum (65535)                           27 FF FF 00 00
    Input (Data, Variable, Absolute)                        81 02
    Report ID (23)                                    85 17
    Usage (Reserved)                            0A 06 FF
    Usage (Reserved)                            0A 0F FF
    Logical Maximum (1)                         25 01
    Physical Minimum (1)                              35 01
    Physical Maximum (16)                             45 10
    Report Count (2)                                  95 02
    Report Size (2)                                   75 02
    Feature (Data, Variable, Absolute)                      B1 02
```

Figure 3A

```
Usage (Reserved)                              0A 04 FF
   Physical Minimum (0)                               35 00
   Physical Maximum (0)                               45 00
   Report Count (1)                                   95 01
   Report Size (1)                                    75 01
   Feature (Data, Variable, Absolute)                         B1 02
   Report Size (3)                                    75 03
   Feature (Constant)                          B1 01
  End Collection                               C0
End Collection                                 C0
Usage Page (Generic Desktop Control)                          05 01
Usage (Mouse)                                  09 02
Collection (Application)                       A1 01
  Usage Page (Generic Desktop Control)                        05 01
  Usage (Mouse)                                09 02
  Collection (Logical)                         A1 02
    Report ID (17)                                    85 11
    Usage (Pointer)                                   09 01
    Collection (Physical)                             A1 00
      Usage Page (Button)                             05 09
      Usage Minimum (1)                        19 01
      Usage Maximum (5)                        29 05
      Report Count (5)                         95 05
      Report Size (1)                                 75 01
      Logical Maximum (1)                             25 01
      Input (Data, Variable, Absolute)                         81 02
      Report Size (3)                                 75 03
      Report Count (1)                         95 01
      Input (Constant)                         81 01
      Usage Page (Generic Desktop Control)                    05 01
      Usage (X)                                09 30
      Usage (Y)                                09 31
      Report Count (2)                         95 02
      Report Size (8)                                 75 08
      Logical Minimum (-127)                          15 81
      Logical Maximum (127)                           25 7F
      Input (Data, Variable, Relative)                         81 06
      Collection (Logical)                            A1 02
        Report ID (18)                         85 12
        Usage (Reserved)                              09 48
        Report Count (1)                              95 01
        Report Size (2)                        75 02
        Logical Minimum (0)                           15 00
        Logical Maximum (1)                           25 01
        Physical Minimum (1)                          35 01
        Physical Maximum (16)                         45 10
        Feature (Data, Variable, Absolute)                       B1 02
```

Figure 3B

```
            Report ID (17)                      85 11
            Usage (Wheel)                       09 38
            Physical Minimum (0)                      35 00
            Physical Maximum (0)                      45 00
            Logical Minimum (-127)                          15 81
            Logical Maximum (127)                     25 7F
            Report Size (8)                     75 08
            Input (Data, Variable, Relative)                81 06

End Collection                              C0
          Collection (Logical)                        A1 02
            Report ID (18)                    85 12
            Usage (Reserved)                        09 48
            Report Size (2)                   75 02
            Logical Minimum (0)                     15 00
            Logical Maximum (1)                     25 01
            Physical Minimum (1)                    35 01
            Physical Maximum (16)                   45 10
            Feature (Data, Variable, Absolute)            B1 02
            Physical Minimum (0)                    35 00
            Physical Maximum (0)                    45 00
            Report Size (4)                   75 04
            Feature (Constant)                            B1 01
            Report ID (17)                    85 11
            Usage Page (Consumer)                   05 0C
            Logical Minimum (-127)                        15 81
            Logical Maximum (127)                   25 7F
            Report Size (8)                   75 08
            Usage (Reserved)                        0A 38 02
            Input (Data, Variable, Relative)              81 06
          End Collection                              C0
        End Collection                                C0
      End Collection                            C0
    End Collection                              C0
Usage Page (Consumer)                           05 0C
Usage (Remote Control)                          09 01
Collection (Application)                              A1 01
  Report ID (1)                           85 01
  Usage Page (Consumer)                         05 0C
  Usage Minimum (0)                       19 00
  Usage Maximum (1023)                    2A FF 03
  Report Count (1)                              95 01
  Report Size (16)                              75 10
  Logical Minimum (0)                     15 00
  Logical Maximum (1023)                        27 FF 03 00 00
  Input (Data, Array, Absolute)                 81 00
  Usage Page (Keyboard/Keypad Keys)             05 07
  Usage Minimum (0)                       19 00
  Usage Maximum (255)                     29 FF
  Report Size (8)                         75 08
  Logical Maximum (255)                   26 FF 00
  Input (Data, Array, Absolute)                 81 00
```

Figure 3C

```
Usage Page (Reserved)                          06 00 FF
Usage (Reserved)                                     0A 0E FF
Input (Data, Variable, Absolute)                     81 02
Usage (Reserved)                                     0A 03 FE
Usage (Reserved)                                     0A 04 FE
Report Count (2)                                     95 02
Report Size (1)                                75 01
Logical Maximum (1)                            25 01
Input (Data, Variable, Absolute)                     81 02
Usage (Reserved)                                     0A 05 FF
Report Count (1)                                     95 01
Report Size (5)                                75 05
Logical Maximum (31)                           25 1F
Input (Data, Variable, Absolute)                     81 02
Report Size (1)                                75 01
Input (Constant)                                     81 01
Usage Minimum (64769)                          1A 01 FD
Usage Maximum (65023)                          2A FF FD
Logical Minimum (1)                            15 01
Logical Maximum (255)                          26 FF 00
Report Size (8)                                75 08
Input (Data, Array, Absolute)                        81 00
Usage (Reserved)                                     0A 02 FF
Logical Maximum (255)                          26 FF 00
Report Size (8)                                75 08
Input (Data, Variable, Absolute)                     81 02
Usage Page (Generic Desktop Control)                 05 01
Usage (Keyboard)                                     09 06
Collection (Logical)                           A1 02
  Usage (Wheel)                                      09 38
  Collection (Logical)                               A1 02
    Report ID (6)                                    85 06
    Usage Page (Generic Desktop Control)                05 01
    Usage (Reserved)                             09 48
    Report Size (2)                                  75 02
    Logical Maximum (1)                              25 01
    Physical Minimum (1)                             35 01
    Physical Maximum (4)                             45 04
    Feature (Data, Variable, Absolute)                  B1 02
    Report ID (2)                                    85 02
    Usage (Wheel)                                    09 38
    Physical Minimum (0)                             35 00
    Physical Maximum (0)                             45 00
    Report Size (8)                                  75 08
    Logical Minimum (-127)                           15 81
    Logical Maximum (127)                            25 7F
    Input (Data, Variable, Relative)                    81 06
  End Collection                                     C0
  Usage Page (Consumer)                              05 0C
  Usage (Reserved)                             0A 38 02
```

Figure 3D

```
Collection (Logical)                              A1 02
  Report ID (6)                                   85 06
  Usage Page (Generic Desktop Control)                  05 01
  Usage (Reserved)                          09 48
  Report Size (2)                                 75 02
  Logical Minimum (0)                             15 00
  Logical Maximum (1)                             25 01
  Physical Minimum (1)                            35 01
  Physical Maximum (16)                           45 10
  Feature (Data, Variable, Absolute)                    B1 02
  Physical Minimum (0)                            35 00
  Physical Maximum (0)                            45 00
  Report Size (4)                                 75 04
  Feature (Constant)                              B1 01
  Report ID (2)                                   85 02
  Usage Page (Consumer)                           05 0C
  Usage (Reserved)                          0A 38 02
  Report Size (8)                                 75 08
  Logical Minimum (-127)                          15 81
  Logical Maximum (127)                           25 7F
  Input (Data, Variable, Relative)                      81 06
End Collection                                    C0
Usage Page (Reserved)                             06 00 FF
Usage (Reserved)                            0A 02 FF
Logical Minimum (0)                         15 00
Logical Maximum (255)                             26 FF 00
Input (Data, Variable, Absolute)                      81 02
Report ID (4)                               85 04
Usage (Reserved)                            0A 01 FE
Report Size (2)                                   75 02
Logical Maximum (3)                         25 03
Input (Data, Variable, Absolute)                      81 02
Usage (Reserved)                            0A 02 FE
Usage (Reserved)                            0A 00 FE
Report Count (2)                                  95 02
Report Size (1)                                   75 01
Logical Maximum (1)                         25 01
Input (Data, Variable, Absolute)                      81 02
Usage (Reserved)                            0A 03 FF
Report Count (1)                                  95 01
Report Size (2)                                   75 02
Logical Maximum (3)                         25 03
Input (Data, Variable, Absolute)                      81 02
Input (Constant)                                  81 01
Report ID (5)                               85 05
Report Size (1)                                   75 01
Logical Maximum (1)                         25 01
Usage (Reserved)                            0A 0B FF
Input (Data, Variable, Absolute)                      81 02
```

Figure 3E

```
    Report Size (7)                              75 07
    Input (Constant)                             81 01
    Usage (Reserved)                       0A 0D FF
    Report Size (16)                             75 10
    Logical Maximum (65535)                      27 FF FF 00 00
    Input (Data, Variable, Absolute)             81 02
  End Collection                           C0
End Collection                             C0
Usage Page (Generic Desktop Control)             05 01
Usage (Reserved)                           09 80
Collection (Application)                         A1 01
  Report ID (3)                            85 03
  Usage Minimum (0)                        19 00
  Usage Maximum (255)                      29 FF
  Logical Minimum (0)                      15 00
  Logical Maximum (255)                    26 FF 00
  Report Size (8)                          75 08
  Input (Data, Array, Absolute)                  81 00
End Collection                             C0
```

Figure 3F

| #  | Field Tag | Input Type      | Logical Min | Logical Max | Count | Size | RepID |
|----|-----------|-----------------|-------------|-------------|-------|------|-------|
| 1  | REMOTE    | -               | -           | -           | -     | -    | -     |
| 2  | INPUT     | Relative        | -127        | 127         | 1     | 8    | 19    |
| 3  | INPUT     | Absolute        | 0           | 3           | 1     | 2    | 20    |
| 4  | INPUT     | Absolute        | 0           | 1           | 2     | 1    | 20    |
| 5  | INPUT     | Absolute        | 0           | 3           | 1     | 2    | 20    |
| 6  | INPUT     | Constant        | 0           | 3           | 1     | 2    | 20    |
| 7  | INPUT     | Absolute        | 0           | 1           | 1     | 1    | 21    |
| 8  | INPUT     | Constant        | 0           | 1           | 1     | 7    | 21    |
| 9  | INPUT     | Absolute        | 0           | 65535       | 1     | 16   | 21    |
| 10 | BUTTON    | -               | -           | -           | -     | -    | -     |
| 11 | INPUT     | Absolute        | 0           | 1           | 5     | 1    | 17    |
| 12 | INPUT     | Constant        | 0           | 1           | 1     | 3    | 17    |
| 13 | X_COORD   | -               | -           | -           | -     | -    | -     |
| 14 | Y_COORD   | -               | -           | -           | -     | -    | -     |
| 15 | INPUT     | Relative        | -127        | 127         | 2     | 8    | 17    |
| 16 | WHEEL     | -               | 0           | 0           | 0     | 0    | -     |
| 17 | INPUT     | Relative        | -127        | 127         | 1     | 8    | 17    |
| 18 | INPUT     | Relative        | -127        | 127         | 1     | 8    | 17    |
| 19 | REMOTE    | -               | -           | -           | -     | -    | -     |
| 20 | INPUT     | Absolute Array  | 0           | 1023        | 1     | 16   | 1     |
| 21 | INPUT     | Absolute Array  | 0           | 255         | 1     | 8    | 1     |
| 22 | INPUT     | Absolute        | 0           | 255         | 1     | 8    | 1     |
| 23 | INPUT     | Absolute        | 0           | 1           | 2     | 1    | 1     |
| 24 | INPUT     | Absolute        | 0           | 31          | 1     | 5    | 1     |
| 25 | INPUT     | Constant        | 0           | 31          | 1     | 1    | 1     |
| 26 | INPUT     | Absolute Array  | 1           | 255         | 1     | 8    | 1     |
| 27 | INPUT     | Absolute        | 1           | 255         | 1     | 8    | 1     |
| 28 | WHEEL     | -               | -           | -           | -     | -    | -     |
| 29 | WHEEL     | -               | -           | -           | -     | -    | -     |
| 30 | INPUT     | Relative        | -127        | 127         | 1     | 8    | 2     |
| 31 | INPUT     | Relative        | -127        | 127         | 1     | 8    | 2     |
| 32 | INPUT     | Absolute        | 0           | 255         | 1     | 8    | 2     |
| 33 | INPUT     | Absolute        | 0           | 3           | 1     | 2    | 4     |
| 34 | INPUT     | Absolute        | 0           | 1           | 2     | 1    | 4     |
| 35 | INPUT     | Absolute        | 0           | 3           | 1     | 2    | 4     |
| 36 | INPUT     | Constant        | 0           | 3           | 1     | 2    | 4     |
| 37 | INPUT     | Absolute        | 0           | 1           | 1     | 1    | 5     |
| 38 | INPUT     | Constant        | 0           | 1           | 1     | 7    | 5     |
| 39 | INPUT     | Absolute        | 0           | 65535       | 1     | 16   | 5     |
| 40 | INPUT     | Absolute Array  | 0           | 255         | 1     | 8    | 3     |

Figure 5

| # | Field Tag | Input Type | Logical Min | Logical Max | Count | Size | RepID |
|---|---|---|---|---|---|---|---|
| 1 | REMOTE | - | - | - | - | - | - |
| 2 | INPUT | Absolute Array | 0 | 1023 | 1 | 16 | 1 |

| # | Field Tag | Input Type | Logical Min | Logical Max | Count | Size | RepID |
|---|---|---|---|---|---|---|---|
| 1 | BUTTON | - | - | - | - | - | - |
| 2 | INPUT | Absolute | 0 | 1 | 5 | 1 | 17 |
| 3 | INPUT | Constant | 0 | 1 | 1 | 3 | 17 |
| 4 | X_COORD | - | - | - | - | - | - |
| 5 | Y_COORD | - | - | - | - | - | - |
| 6 | INPUT | Relative | -127 | 127 | 2 | 8 | 17 |
| 7 | WHEEL | - | 0 | 0 | 0 | 0 | - |
| 8 | INPUT | Relative | -127 | 127 | 1 | 8 | 17 |
| 9 | INPUT | Relative | -127 | 127 | 1 | 8 | 17 |

Figure 9

Button Mask:

| 0 | 0 | 0 | 1 | 1 | 1 | 1 | 1 |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

Figure 11A

X Coordinate Mask:

| 0 | 0 | 0 | 0 | 0 | 0 | 0 | 0 |
|---|---|---|---|---|---|---|---|
| 1 | 1 | 1 | 1 | 1 | 1 | 1 | 1 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

Figure 11B

Y Coordinate Mask:

| 0 | 0 | 0 | 0 | 0 | 0 | 0 | 0 |
|---|---|---|---|---|---|---|---|
| 0 | 0 | 0 | 0 | 0 | 0 | 0 | 0 |
| 1 | 1 | 1 | 1 | 1 | 1 | 1 | 1 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

Figure 11C

Wheel Mask:

| 0 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 1 | 1 | 1 | 1 | 1 | 1 | 1 | 1 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

Figure 11D

Configuration Descriptor:

---

Configuration Descriptor Length (9)
bDescriptorType: CONFIGURATION
wTotalLength: total length of Configuration, Interface, Endpoint and HID descriptors
bNumInterfaces: 2
bConfigurationValue: 1
iConfiguration: 0
bmAttributes:
bMaxPower: 50

---

Interface Descriptor 1

---
Interface Descriptor Length (9)
bDescriptorType: INTERFACE
bInterfaceNumber (zero based): 0
bAlternateSetting: 0
bNumEndpoints: 1
bInterfaceClass: 3 (HID Class)
bInterfaceSubClass: 1
bInterfaceProtocol: 1 (Keyboard)
iInterface: 0

Endpoint Descriptor 1

---
Endpoint Descriptor Length (7)
bDescriptorType: ENDPOINT
bEndpointAddress: Endpoint 1, IN
bmAttributes: Type: Interrupt, No Sync, Data Endpoint
wMaxPacketSize: 8 bytes
bInterval: 10 msec

HID Class Descriptor 1

---
bLength—HID Class Descriptor Length (9)
bDescriptorType: HID Class (0x21)
bcdHID: 01 11
bCountryCode: United States (0x21)
bNumDescriptors: 1
bDescriptorType: Report Descriptor (0x22)
wDescriptorLength

Interface Report Descriptor 1

Usage Page (Generic Desktop Control)
Usage (Keyboard)
Collection (Application)
    Usage Page (Keyboard/Keypad Keys)
    Usage Minimum (224)
    Usage Maximum (231)
    Logical Minimum (0)
    Logical Maximum (1)
    Report Size (1)
    Report Count (8)
    Input (Data, Variable, Absolute)
    Report Count (1)
    Report Size (8)
    Input (Constant)
    Report Count (5)
    Report Size (1)
    Usage Page (LED)
    Usage Minimum (1)
    Usage Maximum (5)
    Output (Data, Variable, Absolute)
    Report Count (1)
    Report Size (3)
    Output (Constant)
    Report Count (6)
    Report Size (8)
    Logical Minimum (0)
    Logical Maximum (139)
    Usage Page (Keyboard/Keypad Keys)
    Usage Minimum (0)
    Usage Maximum (139)
    Input (Data, Array, Absolute)
End Collection

Figure 17

Interface Descriptor 2

---

Interface Descriptor Length (9)
bDescriptorType: INTERFACE
bInterfaceNumber (zero based): 0
bAlternateSetting: 0
bNumEndpoints: 1
bInterfaceClass: 3 (HID Class)
bInterfaceSubClass: 1
bInterfaceProtocol: 2 (Mouse)
iInterface: 0

Endpoint Descriptor 2
---
Endpoint Descriptor Length (7)
bDescriptorType: ENDPOINT
bEndpointAddress: Endpoint 2, IN
bmAttributes: Type: Interrupt, No Sync, Data Endpoint
wMaxPacketSize: 8 bytes
bInterval: 10 msec
---

Figure 19

HID Class Descriptor 2
---
bLength—HID Class Descriptor Length (9)
bDescriptorType: HID Class (0x21)
bcdHID: 01 11
bCountryCode: Default (0)
bNumDescriptors: 1
bDescriptorType: Report Descriptor (0x22)
wDescriptorLength
---

Figure 20

Interface Report Descriptor 2

Usage Page (Generic Desktop Control)
Usage (Mouse)
//————————————————
// Report for relative coordinates mouse
//————————————————
Collection (Application)
    Report ID (1)
    Usage (Pointer)
    Collection (Physical)
        Usage Page (Button)
        Usage Minimum (1)
        Usage Maximum (8)
        Logical Minimum (0)
        Logical Maximum (1)
        Report Count (8)
        Report Size (1)
        Input (Data, Variable, Absolute)
        Usage Page (Generic Desktop Control)
        Usage (X)
        Usage (Y)
        Usage (Wheel)
        Logical Minimum (-127)
        Logical Maximum (127)
        Report Size (8)
        Report Count (3)
        Input (Data, Variable, Relative)
    End Collection
End Collection
//————————————————
// Report for absolute coordinates mouse
//————————————————
Usage Page (Generic Desktop Control)
Usage (Mouse)
Collection (Application)
    Report ID (2)
    Usage (Pointer)    1
    Collection (Physical)
        Usage Page (Button)
        Usage Minimum (1)
        Usage Maximum (3)
        Logical Minimum (0)
        Logical Maximum (1)
        Report Count (3)
        Report Size (1)
        Input (Data, Variable, Absolute)
        Report Count (1)
        Report Size (5)
        Input (Constant)
        Usage Page (Generic Desktop Control)
        Usage (X)
        Usage (Y)

Interface Report Descriptor 2 (cont)

Logical Minimum (0)
        Logical Maximum (4095)
        Physical Minimum (0)
        Physical Maximum (4095)
        Report Size (16)
        Report Count (2)
        Input (Data, Variable, Absolute)
    End Collection
    Report Count (1)
    Report Size (8)
    Usage Page (Reserved)
    Usage Minimum (1)
    Usage Maximum (1)
    Logical Minimum (0)
    Logical Maximum (255)
    Physical Minimum (0)
    Physical Maximum (255)
    Feature (Data, Variable, Absolute)
End Collection
//————————————————
// Report for Remote control
//————————————————
Usage Page (Consumer)
Usage (Remote Control)
Collection (Application)
    Report ID (4)
    Report Size (16)
    Report Count (2)
    Logical Minimum (1)
    Logical Maximum (652)
    Usage Minimum (1)
    Usage Maximum (652)
    Input (Data, Array, Absolute)
End Collection

Figure 21

SWITCH WITH ENHANCED HUMAN INTERFACE DEVICE SUPPORT

FIELD OF THE INVENTION

The present invention relates to communication with human interface devices and, more specifically, to a system and method for switching human interface device connections between hosts while providing enhanced feature support.

BACKGROUND OF THE INVENTION

A keyboard, video and mouse switch (KVM switch) allows a keyboard, video display monitor and mouse to be switched to any of a number of computers when typically one or more person interacts with the computers but only one computer at a time. Recently, keyboard and mouse devices, as well as other peripherals, have moved toward Universal Serial Bus (USB) technology.

USB is a peripheral bus standard developed by the PC and telecom industry, including Compaq, DBC, IBM, Intel, Microsoft, NEC and Northern Telecom. USB defines a bus and protocols for the connection of computer peripherals to computers (and computers to each other). "Universal Serial Bus Specification," Compaq, Intel, Microsoft, NEC, Revision 1.1, Sep. 23, 1998, describes USB and its implementation and is incorporated herein by reference. In addition to standard USB devices and technologies, a newer USB standard 2.x now exists. "Universal Serial Bus Specification," Compaq, Hewlett-Packard, Intel, Lucent, Microsoft, NEC, Philips, Revision 2.0, Apr. 27, 2000 describes the most current USB 2.x standard and its implementation and is incorporated herein by reference. The USB 2.x standard permits faster data transmission than the USB 1.x standard.

KVM switches are designed to connect keyboard and mouse devices to keyboard and mouse connection ports of computers. When switching keyboard and mouse devices between hosts, it may be desirable for it to appear to the host that the keyboard and mouse are always connected, even when they have been "switched" to another host. This is referred to as emulation. This "permanent connection" enables auto-boot functionality and translation.

Typically, before a switch is capable of emulating a human interface device (HID) to a host, the KVM switch must first reading the report descriptor of a HID, which typically occurs during the enumeration phase when a switch recognizes the connection of a new HID. From the report descriptor, a switch may be capable of determining the type of HID (e.g., a keyboard or mouse). The switch may then represent itself as a keyboard and a mouse to the USB host to which the KVM switch is connected. In this manner, the switch prevents the host from entering an enumeration phase each time a user switches from one host to another, which is generally considered undesirable because enumeration introduces delay to the process of switching between hosts.

BRIEF SUMMARY OF THE INVENTION

The applicant has discovered that as USB human interface devices (HIDs) have become more popular, a variety of additional functionality has been built into many HIDs. For example, keyboard and mouse HIDs may each contain special buttons for navigating while browsing the internet or for controlling the volume of the computer to which they are connected. The applicant has discovered that a problem associated with the recent variety of special features on HIDs is that there is no standard structure for reporting such features. Accordingly, it is difficult to emulate HID devices having such features while still enabling their use while connected to a switch.

The present invention provides a switching method and device with enhanced HID features support.

According to one aspect of the invention, a method for supporting a plurality of types of human interfaces devices in a switch includes receiving a human interface device report descriptor from a human interface device during enumeration, the report descriptor identifying a device mapping table having an X coordinate, a Y coordinate and a wheel; analyzing the human interface device report descriptor to determine the device mapping table; creating a button mask table for the button of the device mapping table and storing the button in the button mask table; creating an X coordinate mask table for the X coordinate of the device mapping table and storing the X coordinate in the X coordinate mask table; creating a Y coordinate mask table for the Y coordinate of the device mapping table and storing the Y coordinate in the Y coordinate mask table. The method further includes receiving a report from the human interface device; using the mask tables to extract the button, X coordinate and Y coordinate values from the human interface device report; and inserting the button, X coordinate and Y coordinate values into a switch report, which can be interpreted by the host using a switch report descriptor that is different than the human interface device report descriptor received from the human interface device during enumeration, and which describes a composite human interface device having at least some of the functionality of the human interface device.

The method may further include creating a wheel mask table for the wheel of the device mapping table; storing the wheel in the wheel mask table; and creating the switch report descriptor in part from the information stored in the wheel mask table.

The method may further include sending the switch report to a host connected to the switch.

In addition, each of the button, X coordinate, and Y coordinate mask tables may be a single column table and may include a plurality of rows for storing data and wherein each row is capable of storing one byte of data and each of the button, X coordinate, and Y coordinate mask tables may have nine rows for storing data.

The method may also include receiving a device report descriptor having a Usage field with a value of "Remote Control" and the human interface device report descriptor and the device report descriptor having a Usage field with a value of "Remote Control" may be received from one of: a single human interface during enumeration or different human interface devices during enumeration. The switch report descriptor may further include information corresponding to the Remote Control of the human interface device report descriptor.

In addition, the method may include converting the human interface device report descriptor into a descriptor table wherein each row of the table corresponds to an input report tag from the human interface device report descriptor, and then filtering the descriptor table to remove information unrelated to pointing devices. For example, each row of the descriptor table may include information corresponding to a ReportID, Usage, Report Size, Report Count, Logical Minimum and Logical Maximum of the human interface device report descriptor.

According to an aspect of the invention, a method for supporting a plurality of types of human interfaces devices in a switch includes receiving a human interface device report descriptor from a human interface device via a USB human interface device interface during enumeration; analyzing the human interface device report descriptor to determine a device mapping table; creating a button mask table for the button of the device mapping table; creating an X coordinate mask table for the X coordinate of the device mapping table; creating a Y coordinate mask table for the Y coordinate of the device mapping table; receiving a human interface device report from the human interface device; using the mask tables to extract the button, X coordinate and Y coordinate values from the human interface device report; inserting the button, X coordinate and Y coordinate values into a switch report, which can be interpreted by the host using a switch report descriptor that describes the switch as a composite human interface device; and making the switch report available to one of a plurality of USB host computers connected to the switch via a USB host interface.

According to another aspect of the invention, a switch supporting a plurality of types of human interfaces devices includes at least one USB human interface device interface; a plurality of USB host interfaces; and a master controller. The master controller is configured to receive a human interface device report descriptor from a USB human interface device during enumeration, the report descriptor identifying a device mapping table having an X coordinate, a Y coordinate and a wheel; analyze the human interface device report descriptor to determine the device mapping table; create a button mask table for the button of the device mapping table and storing the button in the button mask table; create an X coordinate mask table for the X coordinate of the device mapping table and storing the X coordinate in the X coordinate mask table; create and a Y coordinate mask table for the Y coordinate of the device mapping table and storing the Y coordinate in the Y coordinate mask table; receive a human interface device report from the human interface device; use the mask tables to extract the button, X coordinate and Y coordinate values from the human interface device report; and insert the button, X coordinate and Y coordinate values into a switch report, which can be interpreted by the host using a switch report descriptor; and switch the at least one USB human device interface among the plurality of USB host interfaces.

The master controller may be further configured to create a wheel mask table for the wheel of the device mapping table; store the wheel in the wheel mask table; and create the switch report descriptor in part from the information stored in the wheel mask table.

In addition, each of the button, X coordinate, and Y coordinate mask tables may be a single column table comprising a plurality of rows (e.g., nine rows) for storing data and wherein each row is capable of storing one byte of data.

The switch report descriptor may include information corresponding to the Remote Control of the human interface device report descriptor.

Also, the master controller may be further configured to convert the human interface device report descriptor into a descriptor table wherein each row of the table corresponds to an input report tag from the human interface device report descriptor.

The switch report descriptor may describe a composite human interface device having a first interface for a keyboard and a second interface for a mouse and remote control class keys and the remote control class keys may correspond to at least one of: special function keys on a keyboard human interface device or special function keys on a mouse human interface device.

BRIEF DESCRIPTION OF THE DRAWINGS

FIGS. 3A-F illustrate an exemplary HID report descriptor;

FIG. 5 illustrates a table produced as a result of performing the process of FIG. 4 on the exemplary HID report descriptor of FIGS. 3A-F;

FIG. 9 illustrates a table produced as a result of performing the process of FIG. 8;

FIG. 11 illustrates a table produced as a result of performing the process of FIG. 10;

FIG. 14 illustrates in greater detail element 1400 of FIG. 12;

FIG. 15 illustrates in greater detail element 1500 of FIG. 12;

FIG. 16 illustrates in greater detail element 1600 of FIG. 12;

FIG. 17 illustrates in greater detail element 1700 of FIG. 12;

FIG. 18 illustrates in greater detail element 1800 of FIG. 12;

FIG. 19 illustrates in greater detail element 1900 of FIG. 12;

FIG. 20 illustrates in greater detail element 2000 of FIG. 12; and

FIG. 21 illustrates in greater detail element 2100 of FIG. 12.

DETAILED DESCRIPTION OF THE INVENTION

The present invention relates to a system and method for switching and HID devices between hosts, and more particularly to a system and method for providing enhanced HID functionality support when switching HIDs between hosts.

Figure 1:
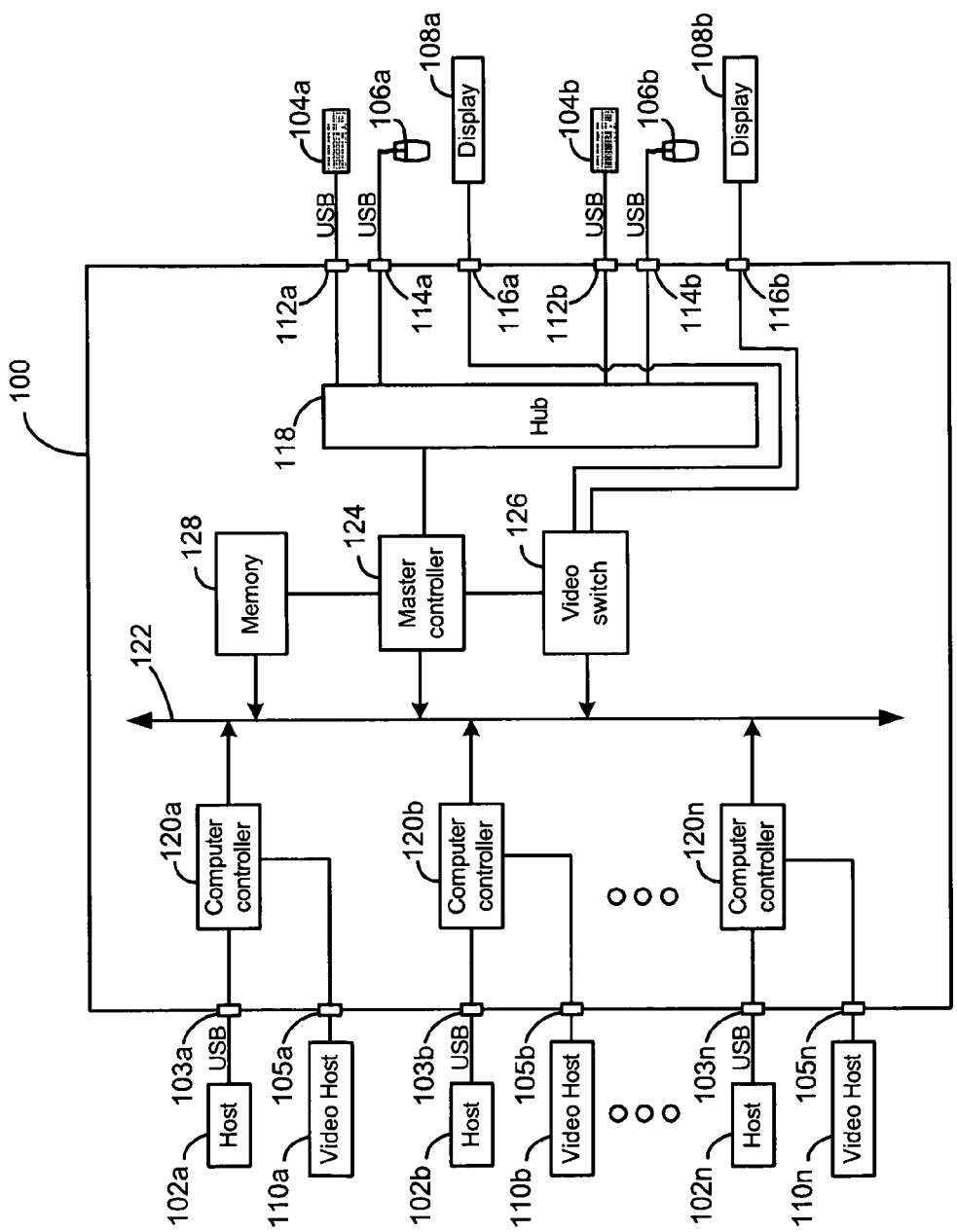
FIG. 1 is a block diagram of a switch enhanced device support.

Turning initially to FIG. 1, a block diagram of a switch with enhanced HID support is illustrated. The switch 100 is generally positioned between and connectable to at least one HID, such as keyboards 104a-b and mice 106a-b, and at least one display device, such as display 108a-b, as well as a plurality of hosts, such as USB host 108x, and a plurality of video sources, such as video source 110x.

FIG. 1 discloses USB HID devices 104a-b and 106 a-b and USB hosts 108a-n, but it will be appreciated by those of skill in the art that other types of HIDs and hosts, such as PS/2, ADB, etc., may be used. In addition, other types of HIDs may also be used. Such HIDs may include, for example, trackballs, touchscreens, pointing sticks, graphics tablets, touch screens, joysticks, and the like. It will be understood by those skilled in the art that certain HIDs, such as touchscreens, combine the functionality of both a mouse, such as mouse 104a, and a display, such as display 108a.

Like a standard KVM switch, the switch 100 is configured to switch HIDs among hosts. While the present disclosure focuses on keyboard and mouse HIDs for clarity, it should be understood that the switch 100 may switch other types of HIDs among hosts. In addition, while the present disclosure focuses on USB HIDs, it should be understood by those of skill in the art that other types of HIDs could be used by implementing similar methodology. Each keyboard 104a-b is connected to switch 100 via a respective keyboard interface 112a-b and each mouse 106a-b is connected to the switch 100 via a respective mouse interface 114a-b. Both the keyboard interface 112a-b and the mouse interface 114a-b are communicably coupled to a master controller 124 via a USB hub 118.

The master controller 124 is communicably coupled to a bus 122. The bus 122 may be any communication bus suitable for use in an HID switch, such as a serial protocol interface (SPI) bus, a parallel bus, an I2C bus, a USB bus, a PS/2 bus or the like. Also communicably coupled to the bus 122 is a plurality of computer controllers 120x. Each computer controller 120x interacts with a host interface 103x. Those skilled in the art will understand that various configurations may be used, such as utilizing a computer controller 120x capable of interacting with multiple host interfaces 103x and emulating multiple keyboard and mouse combinations. It may also be desirable to incorporate the functionality of the master controller 124 and the multiple computer controllers 120x into a single controller.

Thus, the master controller 124 is communicably coupled to each host 102x via the corresponding computer controller 120x, and the master controller 124 is also communicably coupled to each keyboard 104a-b and mouse 106a-b via the hub 118 and interfaces 112a-b and 114a-b. Each of the computer controllers 120x and the master controller 124 may be a control circuit implemented as one or combinations of the following: programmable circuit, integrated circuit, memory and i/o circuits, an application specific integrated circuit, microcontroller, complex programmable logic device, field programmable gate arrays, other programmable circuits, or the like. For example, in one embodiment, the master controller 124 is an ARM7™ microcontroller.

The computer controller 120x communicates with the host 102x and is configured to receive messages (e.g., USB messages) from the host 102x via the host interface 103x. The computer controller 120x is also configured to receive messages from the master controller 124 via the bus 122 and send the messages to the host 102x. Because the computer controller 120x is capable of emulation, the computer controller 120x may appear to the host 102x as an HID, which may be a composite HID (i.e., a single HID having two interfaces). The interfaces of the composite HID may represent for example, a keyboard interface and a mouse interface.

The master controller 124 communicates with the keyboard 104a-b and the mouse 106a-b. The master controller 124 is configured to receive data from the computer controller 120x via the bus 122 and send the received data to the appropriate keyboard 104a-b and the mouse 106a-b. The master controller 124 is also configured to receive data from the keyboard 104a-b and mouse 106a-b and transmit the received data to the computer controller 120x via the bus 122. In addition, the master controller 124 may be capable of emulation such that it appears to keyboard 104a-b and the mouse 106a-b as a host, such as a USB host 102x.

The master controller 124 also controls switching. The master controller 124 is configured to interpret switching commands received from the HIDs via interfaces 112a-b or 114a-b and communicate with the appropriate computer controller 120x via the bus 122. The switching commands received from the HIDs via interfaces 112a-b or 114a-b may contain identification information. Such identification information may include, for example, a user identification number corresponding to the user of the HIDs requesting the switch and a computer identification number corresponding to the computer to which the user of HIDs wishes to connect.

The master controller 124 may also be configured to implement security features. The master controller 124 may allow and disallow certain interfaces 112a-b or 114a-b to communicate with certain host interfaces 103x based on permissions. If the master controller 124 receives a request for a connection that is not allowed, the master controller 124 may deny the connection request and respond back to the interface 112a-b or 114a-b that the connection cannot be made. Further, connections also may be password and/or biometric data protected. Upon receiving a request for a connection that is password protected, the master controller 124 may request that the appropriate password be entered. Once the correct password has been received and authenticated, the master controller 124 may transmit the commands to the appropriate computer controller 120x. If authentication fails, the master controller 124 may deny the request or offer another chance to re-enter the correct password.

Referring next to the video data path, displays 108a-b or the like are connectable to the switch 100 via a video interface 116a-b. Likewise, a video host(s) is connectable to the switch 100 via a video host interface 105x. The video data that is switched may include Display Data Channel (DDC) data, which is a standard created by the Video Electronics Standard Association (VESA) that allows control through software of the settings of a graphical terminal, such as a monitor. Using DDC standard, a monitor can communicate with a video source. A graphical adapter can receive from the monitor all the information about its features and consequently, a graphical adapter is capable of automatic configuration for optimized refresh values depending on the resolution one uses.

Communicably coupled to the video interfaces 116a-b and video host interfaces 105x is a video switch 126, which is in turn communicably coupled to the master controller 124, the bus 122 and the computer controllers 120x. Thus, the master controller 124 may be configured to control the video switch 126 and the switching of the keyboard interfaces 112a-b and mouse interfaces 114a-b. The video interfaces 116a-b may be switched either concurrently with, or independent of, the keyboard interfaces 112a-b and mouse interfaces 114a-b.

Having generally described the switching functionality of the switch 100, various aspects of the enhanced HID functionality of the switch are described in greater detail below. Many HIDs use different report mapping tables to identify the information presented to a computer. For example, the Report ID field may be present in an HID report descriptor only when a mouse has multiple functionality, such as when the mouse is part of a wireless keyboard and mouse assembly and certain keyboard functions are conveyed through the mouse endpoint. Also, the Coordinate X and Coordinate Y fields may have different sizes (e.g., 8, 12 or 16 bits each), as well as different minimum and maximum values, for different mice. In addition, the Wheel field may not exist in some mice report descriptors.

To compensate for the variety of different types of HID report descriptors, a switch may present to a host a switch report descriptor that contains the relevant information that originated from the HID report descriptor(s). In order to populate the switch report descriptor, the switch receives an HID report descriptor from an HID during enumeration. The HID report descriptor received by the switch may identify, for example, a device mapping table having an X coordinate, a Y coordinate and a wheel. The switch may then analyze the HID report descriptor to determine the HID mapping table. Because different HIDs may utilize different mapping tables, the switch may create mask tables for the button, the X coordinate, the Y coordinate and the Wheel of the HID.

When the HID is in use, the HID sends reports to the switch, which the switch receives and translates into switch reports. More specifically, using the information stored in the mask tables, as well as other information from the HID report descriptor, the switch may extract information (e.g., button, X coordinate, Y coordinate, wheel, etc.) from the HID report and insert the extracted information into a switch report, which can be interpreted by the host using the switch report descriptor. The switch report descriptor may be different than the HID report descriptor received during enumeration. For example, the switch report descriptor may describe a composite HID having a first interface for a keyboard and a second interface for a mouse and remote control class keys. The remote control class keys may correspond to, for example, special function keys on a keyboard or mouse HID device.

Preferably, the switch report descriptor describes an HID having at least some of the functionality of the HID connected to the switch. The switch then sends the switch report to a host connected to the switch.

The switch may further create a wheel mask table for the wheel of the device mapping table, store the wheel in the wheel mask table and create the switch report in part from the information stored in the wheel mask table. In addition, each of the button, X coordinate, and Y coordinate mask tables may be a single column table comprising a plurality of rows for storing data and wherein each row is capable of storing one byte of data. In one embodiment, the mask tables comprise nine rows for storing data.

Turning again to FIG. 1, the switch 100 supports a plurality of types of HIDs 104a-b and 106a-b. The switch includes multiple USB HID interfaces 112a-b and 114a-b and a plurality of USB host interfaces 103x. Controlling switching between the HID interfaces 112a-b and 114a-b and the host interfaces 103x is a master controller 124. In addition, the master controller 124 is configured to receive an HID report descriptor from the HIDs 104a-b and 106a-b connected to switch 100, typically during enumeration of the HIDs.

The report descriptor may, for example, identify a device mapping table having an X coordinate, a Y coordinate and a button value. The master controller 124 may analyze the HID report descriptor to determine the HID mapping table. From the information contained in the report descriptor, the master controller 124 may create a button mask table for the button value of the HID mapping table, create an X coordinate mask table for the X coordinate of the HID mapping table, create a Y coordinate mask table for the Y coordinate of the HID mapping table, and create a wheel mask table for the wheel value of the HID mapping table. The mask tables for the button, X coordinate, Y coordinate and wheel may be stored in memory 128 which is communicably coupled to the master controller 124 and may also be communicably coupled to the bus 122. The button, X coordinate, and Y coordinate mask tables may each be a single column table having a plurality of rows for storing data. The tables may each have, for example, nine rows and each row may be capable of storing, for example, one byte of data.

The master controller 124 receives reports from the HIDs during use. For at least some of the reports received by the master controller 124, and preferably for each report received by the master controller 124, the master controller 124 extracts relevant information from the received HID report. For example, the master controller 124 may extract the button value, X coordinate, Y coordinate and wheel value from a received HID report using the mask tables stored in memory 128. The master controller 124 may then insert the extracted information into a switch report that can be interpreted by a host computer using a switch report descriptor. For example, the master controller 124 may insert the button, X coordinate, Y coordinate and wheel values into a switch report created and stored in memory 128. Preferably, the switch 100 sends the switch report to an appropriate host computer 102x connected to the switch 100 based on received switching commands.

In one embodiment, the switch 100 receives an HID report descriptor having a Usage field with a value of "Remote Control" and the master controller 124 creates a switch report descriptor having a Usage field with a value of "Remote Control." The switch report descriptor may include information corresponding to the Remote Control of HID report descriptor.

In addition, the master controller 124 may convert the HID report descriptor into a descriptor table wherein each row of the descriptor table corresponds to an input report tag from the HID report descriptor. Also, the switch report descriptor generated by the master controller 124 and stored in memory 128 preferably describes a composite HID. For example, the switch report descriptor may describe a composite HID having a first interface for a keyboard and a second interface for a mouse and remote control class keys. The remote control class keys of the switch report descriptor may correspond to special function keys on a keyboard HID or special function keys on a mouse HID, or both.

The switch report descriptor preferably describes a composite HID having at least some of the functionality of the HID device from which the switch received the HID report descriptor.

Figure 2:
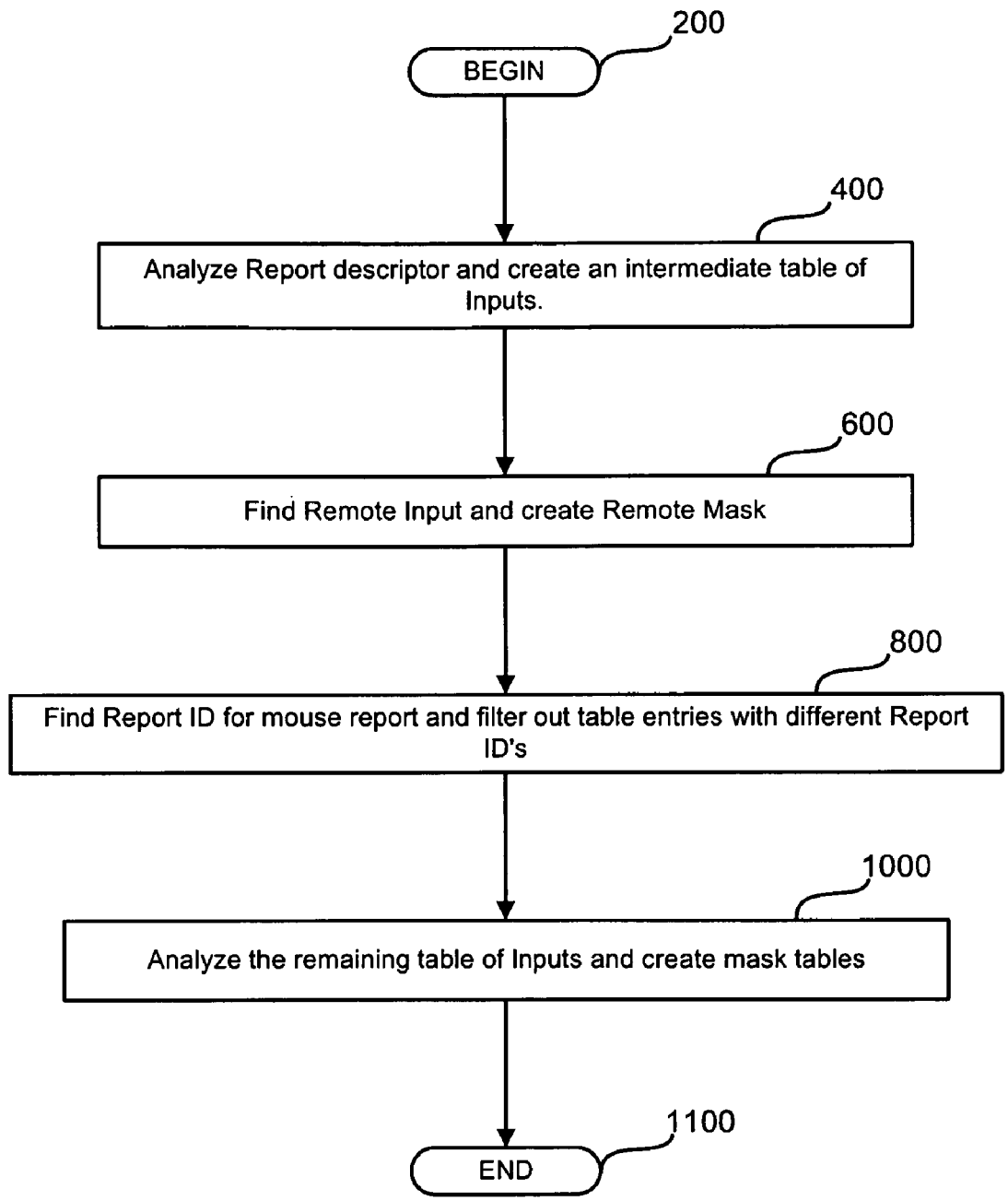
FIG. 2 is a flowchart generally illustrating basic methodology for creating a set of mask tables from an HID report descriptor.

Turning next to FIG. 2, a flowchart generally illustrates an exemplary method for creating a set of mask tables from an HID report descriptor. Flow begins at start block 200 from which flow progresses to process block 400. At process block 400, the report descriptor received from an HID is analyzed and an intermediate table of inputs is created. FIGS. 3A-F illustrate an exemplary report descriptor. The master controller 124 of the switch 100 may perform the analysis and create the intermediate table and store the table in memory 128. Multiple fields from the HID report descriptor may be grouped in a single structure such that there is one row in the table for each input.

Figure 4:
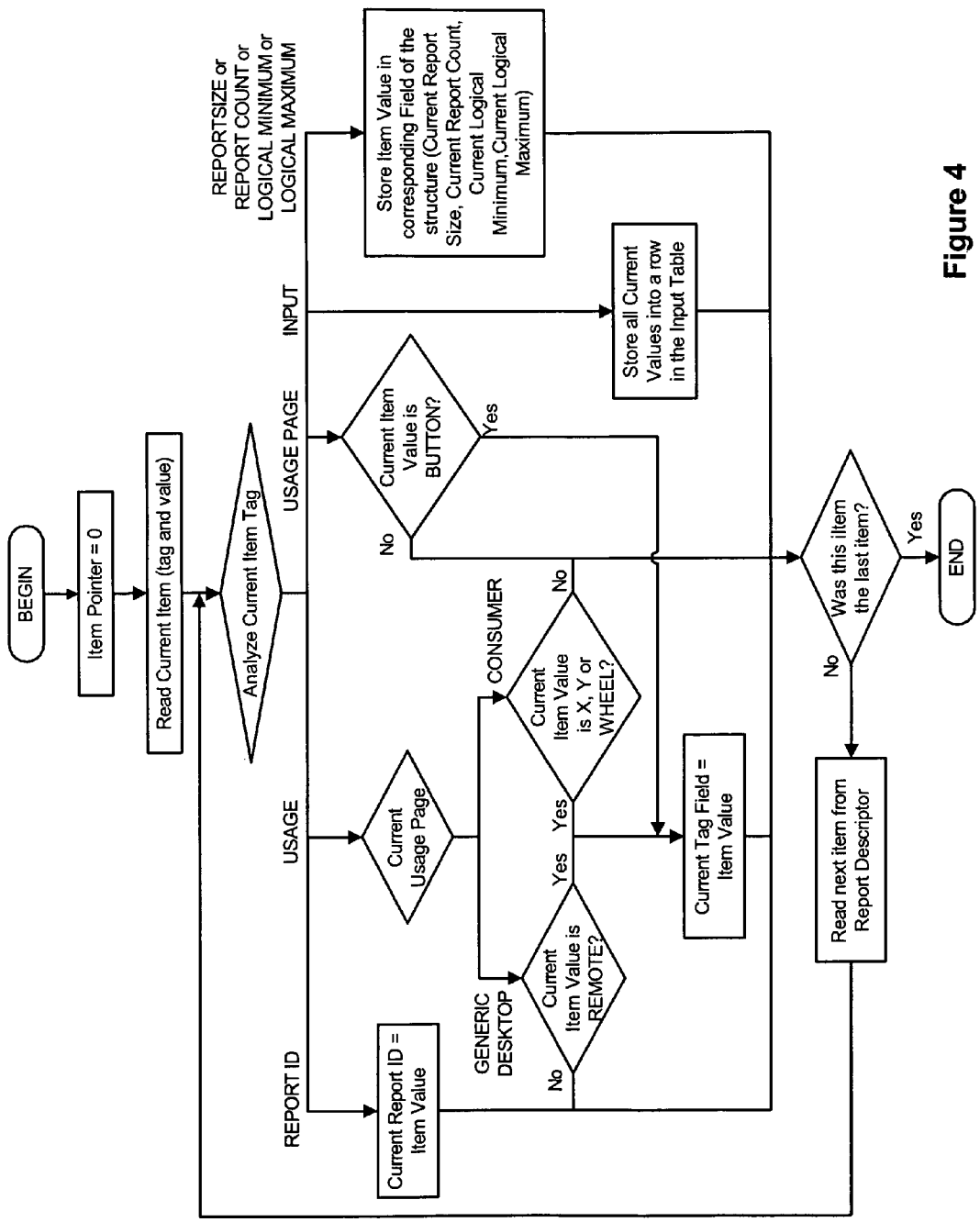
FIG. 4 is a flowchart more specifically illustrating the elements of process block 400 of FIG. 2.

FIG. 4 illustrates in greater detail an exemplary method for performing the process of block 400 of FIG. 2 and FIG. 5 illustrates part of an exemplary table produced as a result of performing the process of FIG. 4 on the exemplary HID report descriptor of FIGS. 3A-F. As shown in FIG. 4, the HID report descriptor is parsed and the information from the HID report descriptor is regrouped into a table (FIG. 5). For each Input (each row) additional information, such as ReportID for the input, Usage field, Size, Count, Logical Minimum and Logical Maximum, may be stored.

Referring again to FIG. 2, flow continues from process block 400 to process block 600. At process block 600, the "Remote Input" is determined and a Remote mask is created. The master controller 124 may determine the Remote Input, create the Remote mask and store the Remote mask in memory 128. In the event that the switch receives multiple reports, the report with the Remote Input may be the only report used by the switch to create the switch report.

Figures 6, 7:
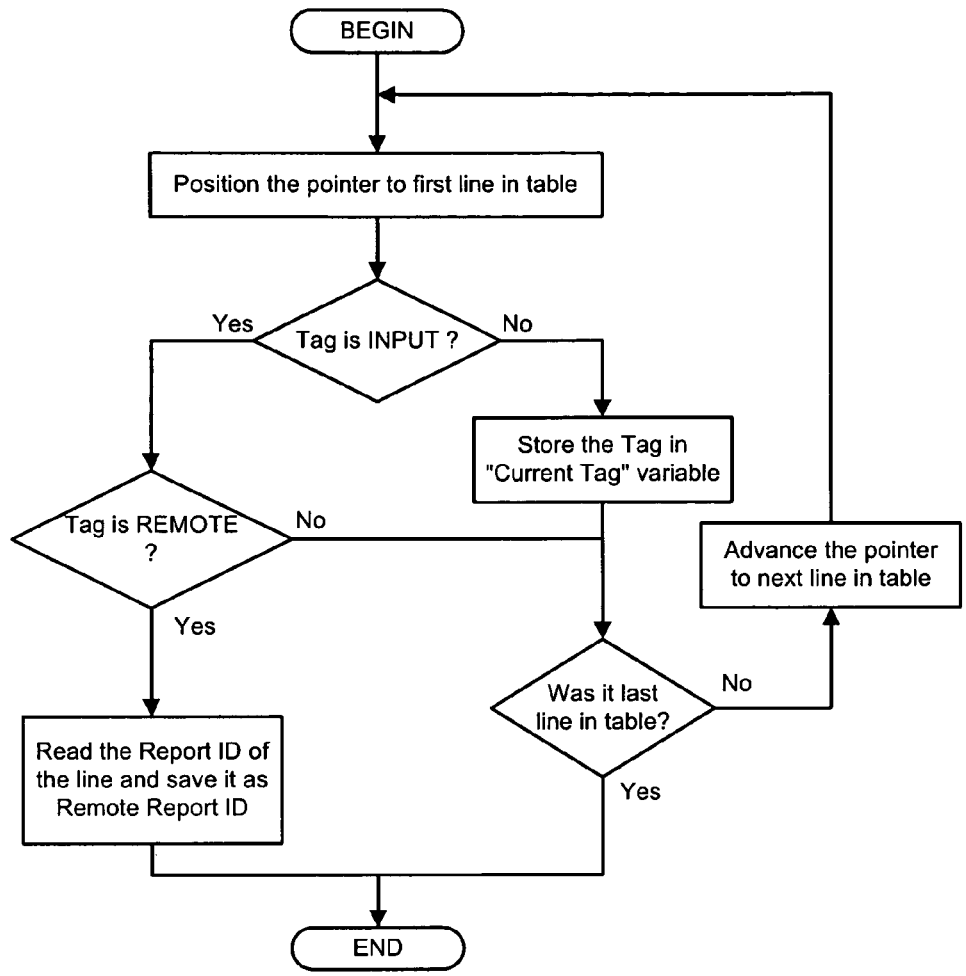
FIG. 6 is a flowchart more specifically illustrating the elements of process block 600 of FIG. 2.
FIG. 7 illustrates a table produced as a result of performing the process of FIG. 6.
Figure 8:
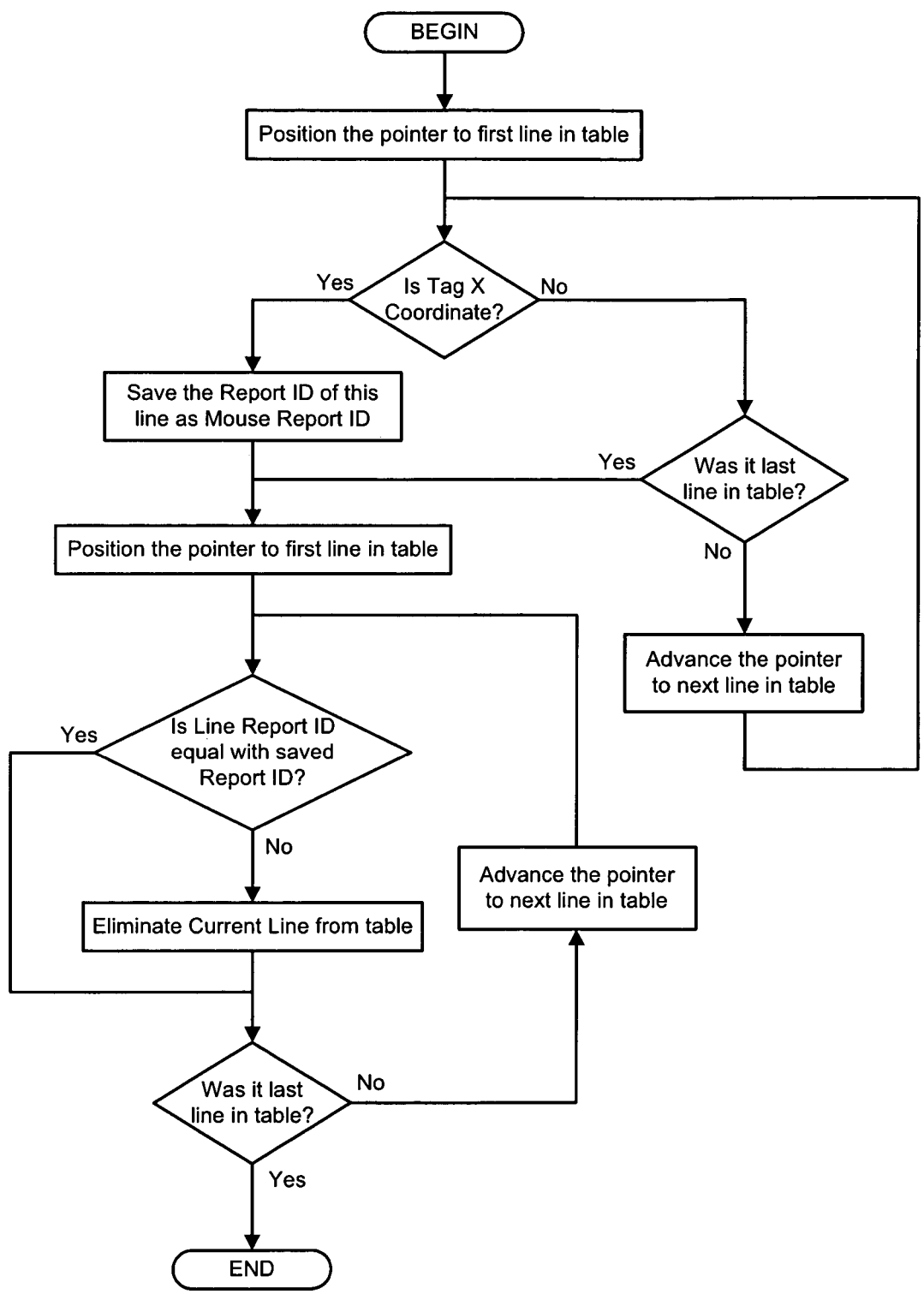
FIG. 8 is a flowchart more specifically illustrating the elements of process block 800 of FIG. 2.

FIG. 6 illustrates in greater detail an exemplary method for performing the process of block 600 of FIG. 2 and FIG. 7 illustrates part of an exemplary table produced as a result of performing the process of FIG. 6. As shown in FIG. 6, the table of FIG. 5 is parsed such that on the Inputs of type (Usage) Remote are retained. The value of the ReportID for those Inputs (if present) is stored for future use. The "Remote" tag is the Usage tag typically used by an HID Report Descriptor to identify packets generated by special non-standard key from a keyboard or mouse, such as multimedia or internet keys and buttons. The master controller 124 of the switch 100 may perform the analysis of FIG. 6, create the table of FIG. 7 and store the table of FIG. 7 in memory 128.

Referring again to FIG. 2, flow continues from process block 600 to process block 800 and FIG. 9 illustrates part of an exemplary table produced as a result of performing the process of block 800. At process block 800, the Report ID for a mouse report descriptor is located in the table of FIG. 7 and other table entries with different Report ID's are eliminated. The master controller 124 may locate the mouse Report ID, filter out the other rows and store the resulting table in memory 128.

Figure 10:
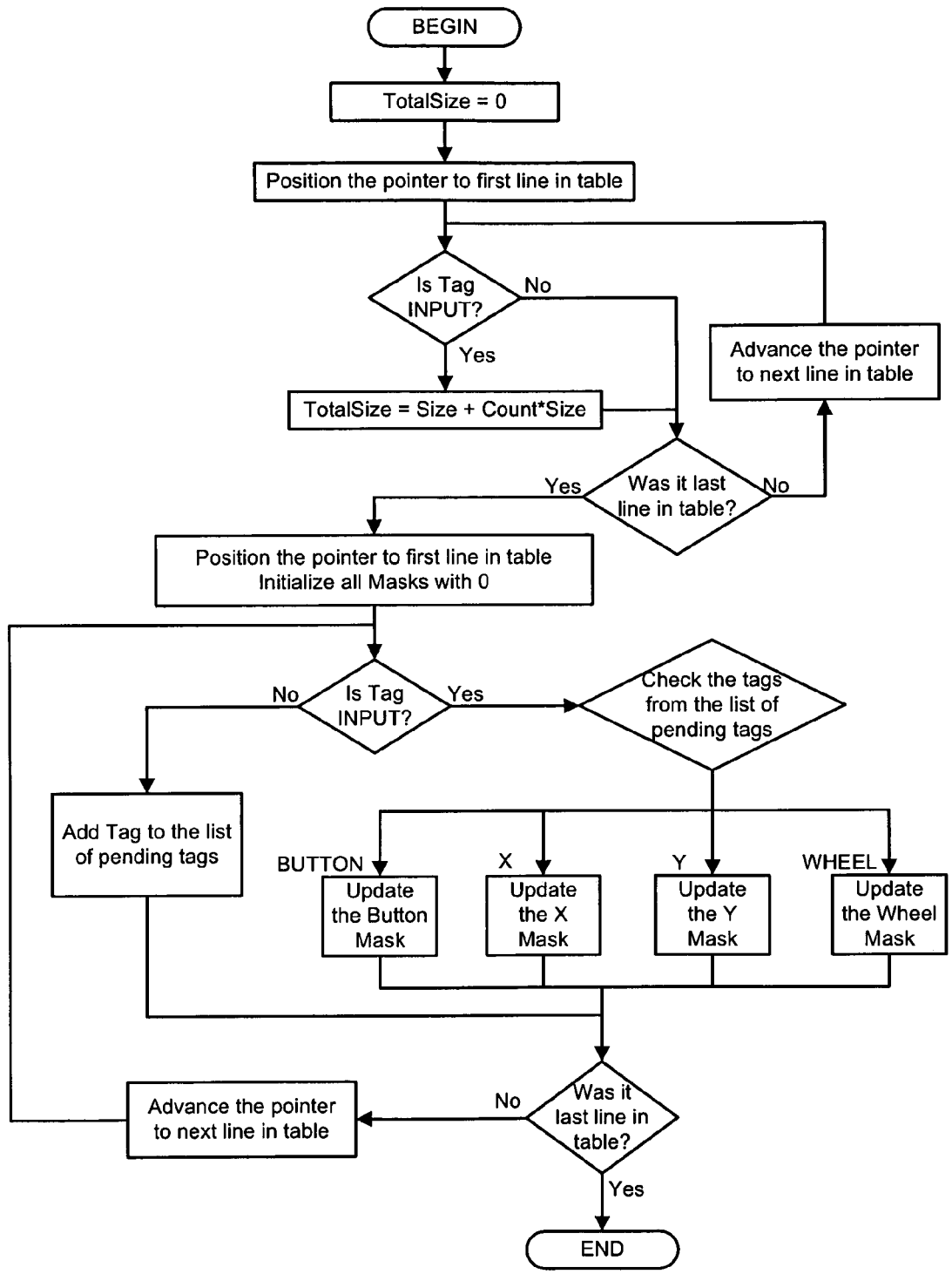
FIG. 10 is a flowchart more specifically illustrating the elements of process block 1000 of FIG. 2.

Flow continues to process block 1000 in which the organization of data for HIDs is evaluated and a set of mask arrays is created and FIGS. 11A-D illustrate exemplary tables produced as a result of performing the process of block 1000. As shown in FIG. 10, each of the button, X coordinate, Y coordinate and wheel values may have a corresponding array. In addition, the Report ID may be identified and saved. The master controller 124 may create and store the mask arrays in memory 128, as well as save the Report ID in memory 128. The information stored can be used to generate the switch report.

Figures 12, 13:
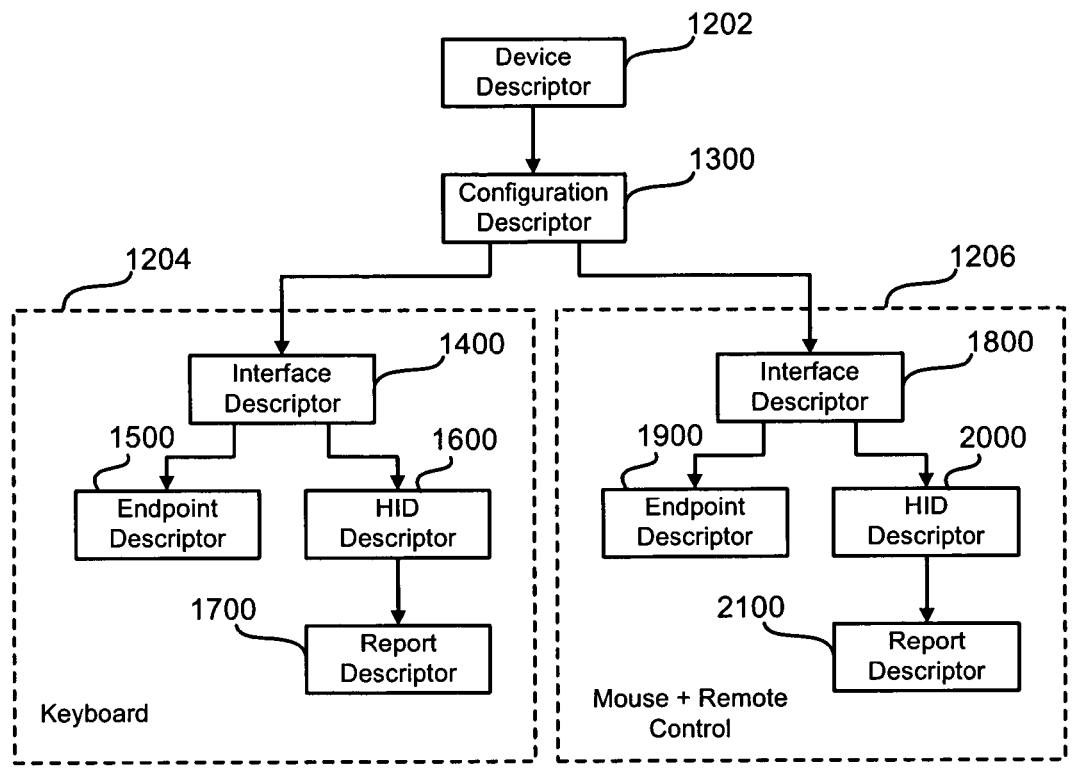
FIG. 12 illustrates an exemplary structure of a switch report descriptor.
FIG. 13 illustrates in greater detail element 1300 of FIG. 12.

Turning next to FIG. 12, an exemplary structure for a switch report descriptor is shown. The switch report descriptor includes a device descriptor 1202, which may identify general characteristics of the switch 100 and provide additional information such as vendor identification and product identification. The switch report descriptor further includes a configuration descriptor 1300. An exemplary configuration descriptor is shown in FIG. 13.

As shown in FIG. 12, the switch report descriptor identifies a composite device having an interface 1204 for a keyboard and an interface 1206 for a mouse and remote control. Referring first the keyboard interface 1204, the keyboard interface 1204 includes a keyboard interface descriptor 1400, an example of which is shown in greater detail in FIG. 14. The keyboard interface 1204 also includes an endpoint descriptor 1500, an example of which is shown in greater detail in FIG. 15, an HID descriptor 1600, an example of which is shown in greater detail in FIG. 16, and a report descriptor 1700, an example of which is shown in greater detail in FIG. 17.

Referring next to the mouse and remote control interface 1206, the mouse and remote control interface 1206 includes a mouse and remote control interface descriptor 1800, an example of which is shown in greater detail in FIG. 18. The mouse and remote control interface 1206 also includes an endpoint descriptor 1900, an example of which is shown in greater detail in FIG. 19, an HID descriptor 2000, an example of which is shown in greater detail in FIG. 20, and a report descriptor 2100, an example of which is shown in greater detail in FIG. 2100.

The switch report descriptor illustrated in FIGS. 12-21 is populated with data derived from the HID report received from the HID device connected to the switch, using the information gathered and organized during processes 400, 600, 800 and 1000 and stored in memory 128. Preferably, the master controller 124 generates the switch report 124.

Many methods and aspects of the inventions have been described herein. The person skilled in the art will understand that many of these methods can be used with other disclosed methods, even if they have not been specifically described in use together. This disclosure describes and discloses more than one invention. The inventions are set forth in the claims of this and related documents, not only as filed, but also as developed during prosecution of any patent application based on this disclosure. The inventors intend to claim all of the various inventions to the limits permitted by the prior art, as it is subsequently determined to be.

Some assemblies of hardware, or groups of steps, are referred to herein as an invention. However, this is not an admission that any such assemblies or groups are necessarily patentably distinct inventions, particularly as contemplated by laws and regulations regarding the number of inventions that will be examined in one patent application, or unity of invention. It is intended to be a short way of saying an embodiment of an invention.

The foregoing discussion should be understood as illustrative and should not be considered to be limiting in any sense. While the inventions have been particularly shown and described with references to preferred embodiments thereof, it will be understood by those skilled in the art that various changes in form and details may be made therein without departing from the spirit and scope of the inventions as defined by the claims.

What is claimed is:

1. A method for supporting a plurality of types of human interfaces devices in a switch comprising:
    receiving a human interface device report descriptor from a human interface device during enumeration, the report descriptor identifying a device mapping table having an X coordinate, a Y coordinate, a button and a wheel;
    analyzing the human interface device report descriptor to determine the device mapping table;
    creating a button mask table for the button of the device mapping table and storing the button in the button mask table;
    creating an X coordinate mask table for the X coordinate of the device mapping table and storing the X coordinate in the X coordinate mask table;
    creating a Y coordinate mask table for the Y coordinate of the device mapping table and storing the Y coordinate in the Y coordinate mask table;
    receiving a human interface device report from the human interface device;
    using the mask tables to extract the button, X coordinate and Y coordinate values from the human interface device report; and
    inserting the button, X coordinate and Y coordinate values into a switch report, which is interpreted by a host using a switch report descriptor that is different than the human interface device report descriptor received from the human interface device during enumeration, and which describes a composite human interface device having at least some functionalities of the human interface device.

2. The method of claim 1 further comprising:
creating a wheel mask table for the wheel of the device mapping table;
storing the wheel in the wheel mask table; and
creating the switch report in part from information stored in the wheel mask table.

3. The method of claim 1 further comprising sending the switch report to a host connected to the switch.

4. The method of claim 1 wherein each of the button, X coordinate, and Y coordinate mask tables is a single column table comprising a plurality of rows for storing data and wherein each row is capable of storing one byte of data.

5. The method of claim 4 wherein each of the button, X coordinate, and Y coordinate mask tables comprises nine rows for storing data.

6. The method of claim 1 further comprising receiving a device report descriptor having a Usage field with a value of "Remote Control."

7. The method of claim 6 wherein the human interface device report descriptor and the device report descriptor having a Usage field with a value of "Remote Control" are received from one of: a single human interface during enumeration or different human interface devices during enumeration.

8. The method of claim 6 wherein the switch report descriptor further comprises information corresponding to the Remote Control of the human interface device report descriptor.

9. The method of claim 1 further comprising converting the human interface device report descriptor into a descriptor table wherein each row of the table corresponds to an input report tag from the human interface device report descriptor.

10. The method of claim 9 further comprising filtering the descriptor table to remove information unrelated to pointing devices.

11. The method of claim 9 wherein each row of the descriptor table comprises information corresponding to a ReportID, Usage, Report Size, Report Count, Logical Minimum and Logical Maximum of the human interface device report descriptor.

12. The method of claim 11 further comprising storing a ReportID corresponding to the button, X coordinate, and Y coordinate mask tables.

13. The method of claim 1 wherein the switch report descriptor describes a composite human interface device having a first interface for a keyboard and a second interface for a mouse and remote control class keys.

14. The method of claim 13 wherein the remote control class keys correspond to at least one of: special function keys on a keyboard human interface device or special function keys on a mouse human interface device.

15. The method of claim 1 wherein the human interface device is a non-keyboard interface device and further comprising receiving a keyboard report descriptor from a keyboard during enumeration.

16. The method of claim 15 wherein the switch report descriptor describes a composite human interface having at least some of the functionality of the keyboard.

17. A method for supporting a plurality of types of human interfaces devices in a switch comprising:
receiving a human interface device report descriptor from a human interface device via a USB human interface device interface during enumeration;
analyzing the human interface device report descriptor to determine a device mapping table;
creating a button mask table for a button of the device mapping table;
creating an X coordinate mask table for the X coordinate of the device mapping table;
creating a Y coordinate mask table for the Y coordinate of the device mapping table;
receiving a human interface device report from the human interface device;
using the mask tables to extract the button, X coordinate and Y coordinate values from the human interface device report;
inserting the button, X coordinate and Y coordinate values into a switch report, which is interpreted by the host using a switch report descriptor that describes the switch as a composite human interface device; and
making the switch report available to one of a plurality of USB host computers connected to the switch via a USB host interface.

18. A switch supporting a plurality of types of human interfaces devices comprising:
at least one USB human interface device interface;
a plurality of USB host interfaces; and
a master controller to:
receive a human interface device report descriptor from a human interface device during enumeration, the human interface device report descriptor identifying a device mapping table having an X coordinate, a Y coordinate, a button and a wheel;
analyze the human interface device report descriptor to determine the device mapping table;
create a button mask table for the button of the device mapping table and storing the button in the button mask table;
create an X coordinate mask table for the X coordinate of the device mapping table and storing the X coordinate in the X coordinate mask table;
create a Y coordinate mask table for the Y coordinate of the device mapping table and storing the Y coordinate in the Y coordinate mask table;
receive a human interface device report from the human interface device;
use the mask tables to extract the button, X coordinate and Y coordinate values from the human interface device report; and
insert the button, X coordinate and Y coordinate values into a switch report, which is interpreted by the host using a switch report descriptor; and
switch the at least one USB human interface device among the plurality of USB host interfaces.

19. The switch of claim 18 wherein the master controller is further configured to:
create a wheel mask table for the wheel of the device mapping table;
store the wheel in the wheel mask table; and
create the switch report in part from the information stored in the wheel mask table.

20. The switch of claim 18, wherein the switch is configured to send the switch report to a host computer connected to the switch.

21. The switch of claim 17 wherein each of the button, X coordinate, and Y coordinate mask tables is a single column table comprising a plurality of rows for storing data and wherein each row is capable of storing one byte of data.

22. The switch of claim 21 wherein each of the button, X coordinate, and Y coordinate mask tables comprises nine rows for storing data.

23. The switch of claim 18 wherein the switch is further configured to receive the human interface device report descriptor having a Usage field with a value of "Remote Control."

24. The switch of claim 23 wherein the switch report descriptor further comprises information corresponding to the Remote Control of the human interface device report descriptor.

25. The switch of claim 18 wherein the master controller is further configured to convert the human interface device report descriptor into a descriptor table wherein each row of the table corresponds to an input report tag from the human interface device report descriptor.

26. The switch of claim 18 wherein the switch report descriptor describes a composite human interface device having a first interface for a keyboard and a second interface for a mouse and remote control class keys.

27. The switch of claim 26 wherein the remote control class keys correspond to at least one of: special function keys on a keyboard human interface device or special function keys on a mouse human interface device.

28. The switch of claim 27 wherein the switch report descriptor describes a composite human interface device such that a host computer connected to the switch will view the switch as a composite human interface device having at least some of the functionality of the human interface device and at least some of the functionality of the keyboard.

* * * * *